United States Patent [19]

Collins

[11] 4,267,798
[45] May 19, 1981

[54] METHOD AND APPARATUS FOR RAISING PLANT AND ANIMAL LIFE IN A MARINE ENVIRONMENT

[76] Inventor: Arthur H. Collins, Rte. 1, Artesian Rd., Eagle, Id. 83616

[21] Appl. No.: 973,089

[22] Filed: Dec. 26, 1978

[51] Int. Cl.³ .............................................. A01K 61/00
[52] U.S. Cl. ........................................................ 119/3
[58] Field of Search ................ 119/3, 2, 4, 5; 43/100, 43/6, 5, 7

[56] References Cited

U.S. PATENT DOCUMENTS

| | | | |
|---|---|---|---|
| 518,319 | 4/1894 | Hoxsie | 119/3 |
| 2,690,158 | 9/1954 | Petty | 119/3 |
| 2,944,513 | 7/1960 | Keely | 119/3 |
| 3,096,600 | 7/1963 | Gwyther | 119/3 X |
| 3,166,043 | 1/1965 | Castillo | 119/3 |
| 3,255,731 | 6/1966 | Girard | 119/3 |
| 3,495,572 | 2/1970 | Groves | 119/3 |
| 3,884,186 | 5/1975 | Hickey | 119/3 |

Primary Examiner—Hugh R. Chamblee
Attorney, Agent, or Firm—B. Deon Criddle

[57] ABSTRACT

A method and apparatus for raising plant and animal life in a marine environment. Fish, snails, other animal life as well as plants are raised in a raceway which is embedded in a bed of porous material with one end lower than the other. Temperature controlled water flows through the raceway with the water movement helping to maintain the water clean of waste products and nitrates that normally accumulate in circulating water tanks. If necessary, geothermal water conducted through tubes proximate to the raceway can be used to maintain the flowing water in the raceway at an ideal temperature for promoting the rapid growth of the fish, plant and animal life. When the fish or other animals being cultivated are ready to be harvested, a catch box designed for use in the raceway is pulled along the raceway. The catch box, with the captured cultivated animals is then removed from the raceway.

8 Claims, 4 Drawing Figures

U.S. Patent    May 19, 1981    4,267,798
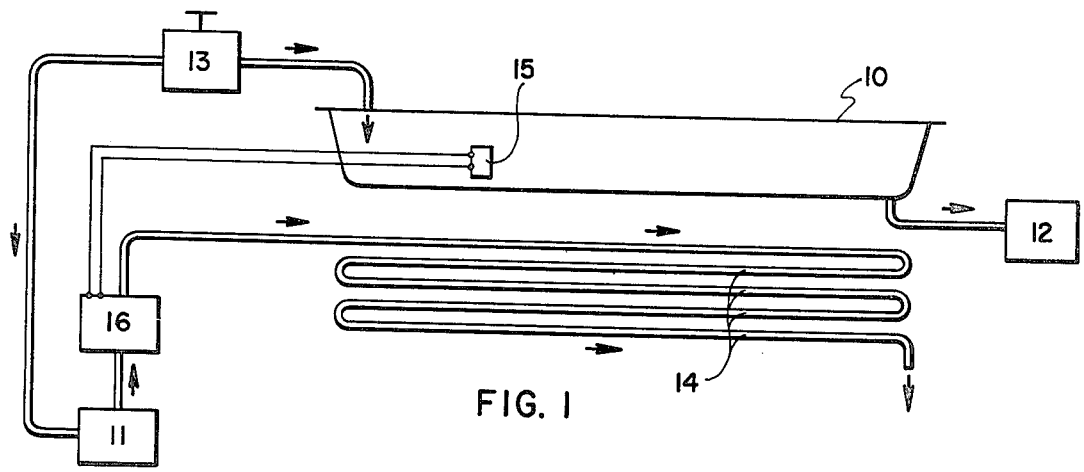
FIG. 1
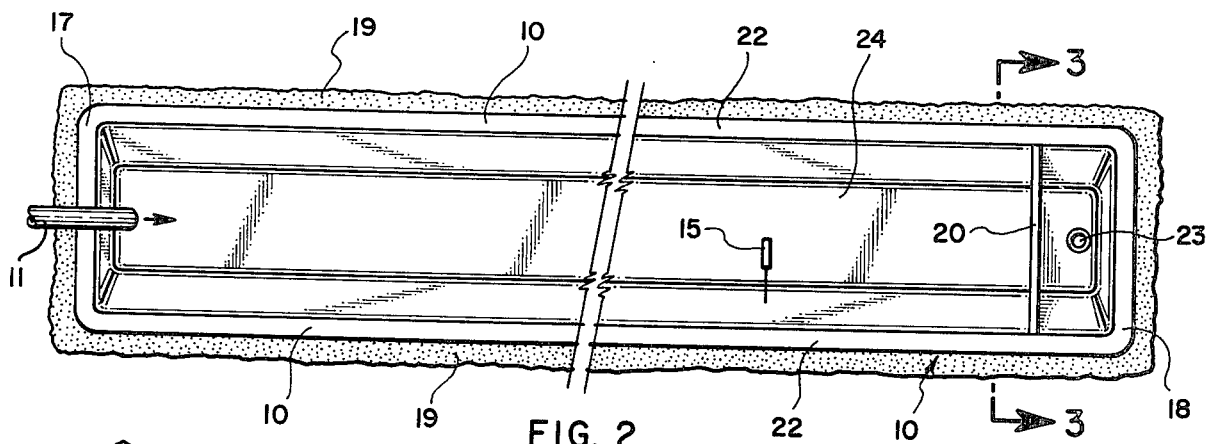
FIG. 2
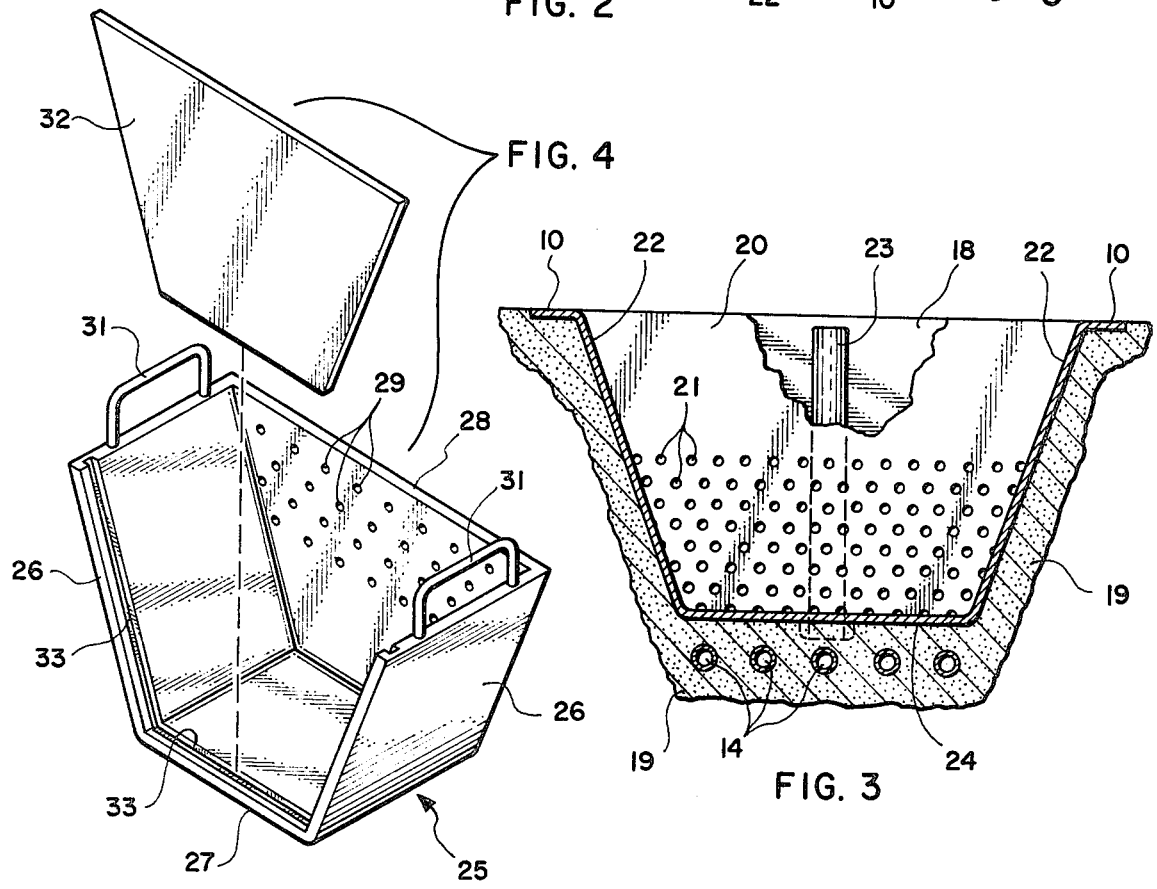
FIG. 4
FIG. 3

METHOD AND APPARATUS FOR RAISING PLANT AND ANIMAL LIFE IN A MARINE ENVIRONMENT

BRIEF DESCRIPTION OF THE INVENTION

1. Field of the Invention

This invention relates to apparatus for use in growing and handling animal life and plants that are necessarily cultivated in a water medium.

2. Prior Art

Tanks, ponds and other such structures for raising fish and water plants are in common use. Various kinds of heaters and pumps have been used to warm, circulate and aerate the water in such structures. Nets and seives are commonly used to handle the fish or other cultivated animal life as they are placed in or are removed from the pond, tanks and the like. To the best of my knowledge, however, there has not heretofore been an apparatus for raising tropical fish and other cultivated animal life, as well as plants, using a raceway wherein flowing heated water is provided in the raceway as a preferred environment for the cultivated animal and plant life. Neither am I aware of the use, in the past, of geothermal water for such purposes or of the use of specially constructed catch boxes to capture the fish or other animal life raised in such raceways.

The present invention is intended for use as a means for commercially raising fish, other animal life and plants in a temperature controlled environment. Typically, the creatures raised will include tropical and subtropical fish, food fish such as trout, catfish, other water animals such as snails and shrimp and water lilies and other water plants. The raceway water temperature is maintained at a constant desired warm temperature regardless of the ambient conditions. By maintaining the constant desired temperature the metabolism of the fish and other animal life is uninterrupted, thus resulting in a shorter maturation period than is required for similar creatures raised in fluctuating ambient temperature conditions. Geothermal energy provides an inexpensive heat source for heating water to permit species of fish and other water creatures and water plants to be raised in climates that are normally not suitable for their growth. Consequently, geothermally heated water is a preferred water source to be flowed through raceways in which fish, other water creatures and/or water plants are raised and that, if necessary, means will be provided to maintain a uniform temperature of the flowing water. It will be apparent however, that the apparatus and method of the invention can be used with any suitable source of heated water. Other suitable sources, for example, include hot waste water from electrical generating and industrial plants, as well as water heated with woodwaste, solar biomass and fossil type fuels. The constant movement of water through the raceway washes fecial matter and nitrates from the animal growing area, thus resulting in a cleaner growing area and a reduced disease rate in the creatures. The use of a rigidly constructed catch box extending fully across the raceway to extract creatures from the raceway minimizes the stress induced in the creatures and results in a high survival rate during the handling process.

SUMMARY OF THE INVENTION

It is a principal object of the present invention to provide a method and apparatus for commercially raising fish, other animal life and plants in climates where they are not naturally found.

Other objects of the present invention are to provide ideal conditions for growth of animal life such as fish and plants to minimize the occurrence of disease in the animals and plants during their growth.

Still another object is to decrease the costs to consumers and users of fish and other animal life by raising them close to the areas in which they are marketed and by minimizing stress intensive handling thereby increasing the survivability of the creatures.

Principal features of the present invention in method and apparatus for raising fish, other water creatures and water plants include the incorporation of a raceway preferably gently inclined to provide for gravity flow of water therethrough, with geothermal energy or otherwise wasted heat energy to produce an efficient means for raising temperature sensitive species of fish, other water creatures and water plants. The raceway is preferably made to have smooth, non-porous inner walls. Heated water flowing through the raceway washes away waste products deposited in the water by the water creatures. The heated water is also preferably used to maintain the temperature of the water moved through the raceway substantially constant. In a preferred embodiment for maintaining the raceway water temperature substantantially constant heated water is flowed through heating tubes to heat the raceway and the water flowing therein by conduction. The flow of heated water through the heating tubes is controlled by a temperature sensor in the raceway and a temperature controlled automatic valve connecting the heating tubes to the source of the water. When fish or other water creatures being cultivated reach harvestable size, a rigid catch box conforming in shape to the raceway is pulled from one end of the raceway to the other. Holes in one panel of the catch box allow water and small fish or other water creatures to pass through while the creatures of a size to be harvested are entrapped by the box. The creatures are then removed from the raceway with the box.

THE DRAWING

In the drawings:

FIG. 1 is a schematic layout of the apparatus of the invention used in raising fish, other water animals and water plants;

FIG. 2, a top plan view of the raceway;

FIG. 3, a vertical section view of the raceway, taken on the line 3—3 of FIG. 2, and showing the raceway embedded in a bed of porous material; and FIG. 4, an exploded perspective view of the catch box taken from slightly above and at one corner.

DETAILED DESCRIPTION

Referring now to the drawings:

In the illustrated preferred embodiment, the apparatus for raising fish, other water animals and water plants, schematically shown in FIG. 1, includes a raceway 10 in which the creatures and plants are raised; a geothermally heated water source 11; a conventional waste disposal system 12; a regulating valve 13; a plurality of heating tubes 14; and a temperature sensor 15 located in the raceway 10 and connected to a temperature controlled automatic valve 16 for regulating the flow of geothermal heated water through the heating tubes 14.

The raceway 10 is constructed of a rigid impervious material such as fiberglass and is more fully illustrated in FIGS. 2 and 3. In the preferred form, the raceway 10 is embedded in a bed of porous heat conductive material 19, such as sand. An upstream end 17 of the raceway is positioned to be slightly higher than a downstream end 18, preferably producing an incline of about one ince in sixty feet when gravity alone is used to move water through the raceway. Water is fed into the raceway 10 from the geothermally heated water source 11 through the regulator valve 13 at the upstream end 17 of the raceway. The incline in the raceway 10 induces a steady flow of water by force of gravity from the upstream end 17 to the downstream end 18. As will be further explained, the flowing water carries waste products from animal creatures raised in the raceway to the downstream end 18.

A partition 20 is located in the raceway 10 near the downstream end 18. The partition extends between sides 22 of the raceway and a lower portion of the otherwise solid partition 20 is perforated with holes 21. An upstanding overflow drain pipe 23 extends through the bottom 24 of the raceway 10 and is located between the panel 20 and the downstream end 18 of the raceway. The lower end of the upstanding overflow drain pipe 23 is connected to the waste disposal system 12 and the open top thereof is at a level slightly below the upper edges of sides 22 and the partition 20. The water in the raceway 10 flows down through the series of perforations 21, over the top thereof and into the upstanding overflow drain pipe 23, and to the waste disposal system 12. The perforations 21 in the bottom portion of the panel 20 allow flow of water and suspended and deposited waste products scoured from the bottom of the raceway through to the drain pipe 23 and results in a maximum removal of waste products from the raceway 10 by the water. It will be apparent that heat will be lost from the water as it moves through the raceway. The amount of heat loss will depend largely on atmospheric conditions, but in at least some cases may be so great that the water in the raceway must be re-heated by a heating system as it moves through the raceway.

In a preferred embodiment of the heating system, the heating tubes 14 are embedded proximate to the raceway 10 in the bed of heat conductive porous material 19. When the temperature of the water in the raceway 10 drops below a predetermined temperature, as sensed by the temperature sensor 15 positioned in the raceway beneath the level of flowing water, the temperature controlled automatic valve 16 opens, allowing hot water to flow from the geothermally heated water source 11 through the heating tubes 14. As the hot water flows through the heating tubes 14 the heat conductive porous bed 19, the raceway 10, and the water in the raceway are heated by conduction. The flow of hot water through the heating tubes 14 automatically ceases when the water temperature in the raceway has risen to a predetermined level, and this change in temperature is sensed by the temperature sensor 15 to operate the temperature controlled automatic valve 16. The system thus maintains the water in the raceway 10 within the temperature range necessary to promote the rapid growth of fish or other water animals or plants placed in the raceway. It will be apparent that the same temperature sensor 15 could as well be operated to regulate a valve, not shown, through which moderating cold water could be fed into the raceway in the event the geothermally heated water temperature was too high for the creatures or plants being grown in the raceway.

Water animals are removed from the raceway 10 using a catch box, shown generally at 25 in FIG. 4. The catch box is comprised of two sides 26 and a bottom 27 shaped to fit in a cross section of the raceway 10. A downstream panel 28 forms a back wall for the catch box 25 and an upper portion of the panel 28 contains a series of holes 29. A sealing gasket 30 surrounds a front opening formed by the side and bottom walls. In use, the catch box 25 is placed in the raceway 10 at the downstream end 18, such that the downstream panel 28 is nearest to the downstream end 18 and the gasket 30 provides a seal between the walls and bottom of the catch box and the walls and bottom of the raceway. The catch box 25 is then pulled the length of the raceway 10 by means of handles 31 mounted on the sides 26. The holes 29 allow water and small undesirable water creatures too small for harvesting to pass therethrough, but are small enough to prevent larger harvestable fish from passing through. After the catch box 25 has been pulled the entire length of the raceway 10, a removable panel 32 is inserted into a groove 33 formed in the catch box 25 to thereby form a fourth side and to entrap the creatures unable to pass through holes 29 in the catch box 25. The catch box 25, with the harvested creatures, is then removed from the raceway 10.

Although a preferred embodiment of my invention has been herein disclosed, it is to be understood that the present disclosure is by way of example and that variations are possible without departing from the subject matter coming within the scope of the following claims, which subject matter I regard as my invention.

I claim:

1. Apparatus for raising plant and animal life in a marine environment comprising
    an elongate raceway through which water is flowed, said raceway including a bottom and side walls extending upwardly from opposite sides of said bottom, an inlet end wall and an outlet end wall;
    a source of heated water;
    means for supplying heated water from said source to the inlet end of said raceway;
    a partition extending across the raceway, said partition providing a solid barrier across the raceway at an upper portion thereof and being perforated at a lower portion thereof;
    a discharge pipe extending upwardly in the raceway to a height just below the uppermost edges of the side walls and partition; and
    a catch box in the raceway, said catch box including a bottom and a pair of side walls adapted to fit snugly within the raceway bottom and side walls,
    a downstream panel forming a back wall interconnecting the bottom and side walls of the catch box, said downstream panel having a solid lower portion and a perforated upper portion to allow water flow therethrough and to restrict movement of fish therethrough, and a removable panel interconnecting the upstream ends of the bottom and side walls of the catch box.

2. Apparatus as in claim 1, wherein the catch box further includes
    handle means thereon, whereby said catch box may be moved along the raceway.

3. Apparatus as in claim 2, wherein
    the heated water is provided by a geothermally heated source; and the inlet end is slightly higher than the outlet end of the raceway to thereby provide gravity flow of water along the raceway.

4. Apparatus as in claim 3, further including means to heat the water moving through the raceway.

5. Apparatus as in claim 4, wherein the means for heating water moving through the raceway includes conduit means connected to the source of geothermally heated water, said conduit means being arranged so that hot water passed therethrough conductively heats the water moving through the raceway.

6. Apparatus as in claim 5, further including a porous bed of material beneath the raceway, and wherein the conduit means is embedded in said porous bed of material.

7. A method of handling and growing animal life in water comprising providing a restricted area in a flow stream of heated water in which animal life is placed and can freely move;

using the flow stream of water to wash away animal waste from said restricted area; and capturing the animal life by moving a catch box having a bottom, sides and a downstream panel interconnecting the bottom and sides and extending fully across the flow stream, said panel having perforations therein to permit water flow therethrough and to restrict passage of larger animal life therethrough while allowing passage of smaller animal life therethrough, along the length of the raceway from the discharge end to the inlet end, closing the upstream end of the catch box and raising the catch box from the flow stream.

8. Apparatus for raising plant and animal life in a marine environment comprising an elongate raceway having a bottom and interconnected side and inlet and outlet end walls projecting upwardly from the bottom;

means for supplying water source to the inlet end of the raceway;

means for removing water from an upper portion of the raceway adjacent to the outlet end thereof; and a catch box in the raceway, said catch box including a bottom and a pair of side walls adapted to respectively fit snugly against the bottom of the raceway and the side walls thereof, a perforated downstream panel interconnecting the bottom and side walls of the catch box at a downstream end thereof, and a removable panel sealingly interconnecting the upstream ends of the bottom and side walls of the catch box.

* * * * *